United States Patent [19]
Breant

[11] Patent Number: 5,804,681
[45] Date of Patent: Sep. 8, 1998

[54] SILANATED POLYAMIDES

[75] Inventor: Patrice Breant, Serquigny, France

[73] Assignee: Elf Atochem S. A., Puteaux, France

[21] Appl. No.: 486,787

[22] Filed: Jun. 7, 1995

[51] Int. Cl.$^6$ .............................. C08G 69/08; C08G 73/10
[52] U.S. Cl. .......................... 528/310; 528/312; 528/322; 525/63; 525/100; 525/101; 525/178; 525/474
[58] Field of Search ............................ 525/63, 100, 101, 525/178, 474; 528/310, 312, 322; 521/112, 110, 86

[56] References Cited

U.S. PATENT DOCUMENTS 4,783,511  11/1988  Schmid .................................... 525/431

FOREIGN PATENT DOCUMENTS 0 182 163 A2  5/1986  European Pat. Off. .
2 187 464  9/1987  United Kingdom .

OTHER PUBLICATIONS

Asahi, Derwent WPI, AN 87–325288/46 (1987).
Kao, Derwent WPI, AN 84–284631/46 (1984).
Kao, Derwent WPI, AN 86–004880/01 (1986).
Teijin, Derwent WPI, AN 82–20125e/11 (1982).

*Primary Examiner*—Duc Truong
*Attorney, Agent, or Firm*—Pennie & Edmonds LLP

[57] ABSTRACT

The present invention relates to thermoplastic polyamides and to thermoplastic elastomers based on polyamide with improved thermomechanical performance. They are obtained by grafting along the polymer chain with alkoxysilanes having at least one unsaturation, and especially vinyltrialkoxysilanes of formula $CH_2=CH-Si-(OR)_3$ where R represents an alkyl or an alkoxy-substituted alkyl group. The weight ratio of the silane to polyamide in the grafted polymer is generally between 0.1 and 5%. These grafted polyamides may be crosslinked by hydrolysis in steam at 100° C. or by contact with water. The grafted and optionally crosslinked polyamides may be used for producing molded or extruded articles, such as tubes, jackets, single-layer and multilayer films and complex parts, and powder for coating substrates.

9 Claims, No Drawings

SILANATED POLYAMIDES

FIELD OF THE INVENTION

The subject of the present invention is thermoplastic polyamides with improved thermomechanical performance. The improved thermoplastic polyamides of the present invention are obtained by grafting along the polymer chain with alkoxysilanes.

BACKGROUND OF THE INVENTION

Commercial thermoplastic polyamides, for example such as nylon-11 or nylon-12 of number-average molecular weight between 10,000 and 30,000, can be used especially in the form of molded or extruded articles, but have a limited dimensional heat stability (temperature of bending under a load of 1.85 MPa measured according to the ISO 75 Standard), for example less than 50° C. for nylon-11 and 55° C. for nylon-12, not insignificant swelling in contact with certain solvents, in particular methanol, and rather average hydrolytic stability.

Various methods have been tried to remedy the drawbacks of the polyamides mentioned hereinabove. In particular, the properties mentioned hereinabove may be improved by means of crosslinking. However, conventional crosslinking using radical initiators is impossible in the case of polyamides because of their high processing temperatures, at which temperatures there is premature decomposition of the initiator when incorporating it into the polyamides in the molten state within an extruder.

However, the polyamides have been able to be chain-end modified chemically by substances which can subsequently induce the crosslinking of the polymers, such as silylated substances. Examples of the modifications of the endgroups of polyamides are:

JP-59,174,674 in the name of KAO Corp., in which amine-terminated and/or vinyl-terminated polyamides are made to react beforehand with vinylalkoxysilanes;

JP-60,233,132 in the name of KAO Corp., in which amine-terminated polyamides have been crosslinked after the action of acryloxyalkoxysilanes; and DE 3,545,032 in the name of EMS-Inventa AG, in which the polyamides are made to react beforehand with alkoxysilanes having various reactive functions, such as epoxy, isocyanate, anhydride, etc. functions.

It has also been proposed to blend the polyamides with polyoxyphenylenes in JP-62,232,455 in the name of Asahi Chemical Industry Co. and in EP 182,163 in the name of General Electric Co. in order to improve their mechanical properties after grafting and crosslinking.

SUMMARY OF THE INVENTION

In order to provide polyamides with improved thermal properties, thermoplastic polyamides grafted along the polymer chain with alkoxysilanes having at least one unsaturation and which may be easily crosslinked have now been developed. The polyamides according to the invention contain aliphatic and/or cycloaliphatic and/or aromatic groups and are optionally copolymerized, but they are not chemically modified subsequent to their polycondensation and prior to their grafting, as are prior art polyamides mentioned hereinabove.

The present invention thus provides a thermoplastic elastomer comprising a polyamide having at least one polymeric chain and two or more endgroups, wherein the polymeric chain has grafted thereto at least one moiety derived by reacting said polyamide with an unsaturated alkoxysilane in the presence of a polymerization initiator. The endgroups are not silanated. Generally, the silanated polyamides of the present invention will have a plurality of polymeric chains which have grafted thereto from about 0.1 to about 5 weight-percent of the silane moieties. The polyamide can be an aliphatic, cycloaliphatic, or aromatic polyamide or a copolymer thereof. The unsaturated alkoxysilane can be an (acryloxyalkyl)trialkoxysilane, a (methacryloxyalkyl) trialkoxysilane, or a silane of the formula $CH_2=CH-Si(OR)_3$ wherein R is an alkyl or an alkoxyalkyl group.

The present invention also provides a process for preparing these thermoplastic elastomers. The process comprises providing an extruder having at least two zones at elevated temperatures, introducing a polyamide having at least one polymeric chain into a first zone of the extruder whereby the polyamide is melted, moving the melted polyamide into a second zone of the extruder, and introducing into the melted polyamide in the second zone a mixture comprising a molten unsaturated alkoxysilane having dissolved therein a polymerization initiator.

Still another aspect of the present invention is a grafted polyamide thermoplastic elastomer as described above wherein the grafted polyamide is hydrolytically crosslinked.

Finally, the present invention also provides articles of manufacture that comprise the thermoplastic elastomers in molded or extruded form.

DESCRIPTION OF THE PREFERRED EMBODIMENTS

The polyamides which can be improved in accordance with the present invention include those polymers commonly referred to as nylons. Polyamides according to the invention also include polyamide-based thermoplastic elastomers which are block copolymers, also called polyetheramides, the hard blocks of which consist of polyamide and the crystallizable soft blocks of polyether.

The polyamides may be plasticized using commonly used additives for this kind of modification. They may be filled and/or contain various additives, for example additives intended to protect the PA from thermo-oxidation, thermo-ultraviolet-degradation, and so on.

Among alkoxysilanes having an unsaturation that may be used in accordance with the present invention are vinyltrialkoxy-silanes of formula $CH_2=CH-Si-(OR)_3$ where R represents an alkyl or an alkoxy-substituted alkyl group. Preferred species include: $CH_2=CH-Si-(OCH_3)_3$ vinyltrimethoxysilane (VTMO) $CH_2=CH-Si-(OCH_2CH_3)_3$ vinyltriethoxysilane (VTEO) $CH_2=CH-Si-(OCH_2OCH_2CH_3)_3$ vinyltrimethoxyethoxysilane (VTMOEO).

Other alkoxysilanes having an unsaturation that may be used in accordance with the present invention are (acryloxyalkyl)trialkoxysilanes and (methacryloxyalkyl)trialkoxysilanes, especially, (3-(methacryloxy)propyl)-trimethoxysilane.

The weight ratio of silane to polyamide in the grafted polymer is generally between 0.1 and 5%.

The invention also relates to a process for preparing the grafted thermoplastic polyamides and elastomers defined previously. The grafting of the polyamides is carried out in the molten state in the presence of one or more radical initiators, the polyamides being polymerized beforehand, for example by condensation polymerization or addition polymerization.

The grafting reaction is carried out in a single-screw or twin-screw extruder fed with polyamide in a feed hopper, for example in the form of granules. The polyamide is melted by heating in a first zone of the extruder and the reactants are introduced into the molten mass of PA in a second zone.

The radical initiators may be chosen from peroxides, peracids, peresters and peracetals. They are generally used in amounts from 0.01% to 0.5% by weight with respect to the PA to be grafted. By way of example, mention may be made of:

dicumyl peroxide (DICUP);
2,5-dimethyl-2,5-di-tert-butylperoxyhexane (DHBP);
1,3-bis-(tert-butylperoxyisopropyl)benzene (Yl490).

It is preferred to dissolve the radical initiator in the liquid vinylalkoxysilane before introducing them, for example by means of a metering pump, into the polyamide in the molten state.

It is advantageous to introduce the reactants, as well as to mix them, in the polyamides in the surfused state, that is to say at a temperature below the melting temperature of the polyamides. This is done so as to prevent inopportune and uncontrolled initiation of the reaction. It is preferred that the zone for introducing the reactants be sufficiently long and at a sufficiently low temperature to ensure good dispersion of the reactants and as little as possible thermal decomposition of the radical initiator.

The actual grafting reaction takes place in a third zone of the extruder at a temperature capable of completely decomposing the radical initiator. Before the molten mass leaves into the extruder head, a degassing zone is provided where the initiator decomposition products and the unreacted vinylsilane are degassed, for example under vacuum.

The grafted polyamide is recovered on emerging from the extruder, for example in the form of granulated rods, after cooling with cold air.

In order to limit self-heating of the molten mass, it is preferred to work at a low screw speed. Screw speeds of greater than 100 rpm for a constant output of 5 kg/h are particularly deleterious to the grafting reaction proceeding correctly (runaway reaction).

The grafting efficiency is between 1 and 100% depending on the operating conditions. The grafting yield depends on the extrusion output and on the screw speed. By way of illustration, for an extruder output of 5 kg/h, the efficiency is low (lying between 10 and 20%), while when the output is limited to 4 kg/h the grafting efficiency becomes greater than 30%. It is therefore possible to increase this efficiency by decreasing the screw speed on the one hand and the extruder output on the other hand.

hydrolysis in steam at 100° C. or by contact with water. The kinetics of hydrolysis of the alkoxysilane functions, and therefore the kinetics of crosslinking, are appreciably increased by incorporating a catalyst, such as dibutyltin dilaurate, during grafting of the polyamide.

The degree of crosslinking of the grafted polyamides according to the invention is determined by measuring the insoluble content at 90° C. in m-cresol. It is considered that a well-crosslinked product has an insoluble content of 80%.

EXAMPLES

In all the examples, the solution viscosity is measured in m-cresol at 20° C. in a solution having 0.5 g of polyamide for 50 ml of solvent, and expressed in dl/g.

Examples 1 To 13 grafting of nylon-11 under different operating conditions

The PA grafted is a 13,000 $\overline{M}_n$ nylon-11 of solution viscosity of approximately 1 dl/g. The grafting was carried out in 2 extruders with different profiles:

(1) one extruder has a gently inclined temperature profile and a screw speed of 130 rpm, the nominal temperature being between 210 and 220° C.

(2) the second extruder has a cup-shaped profile, such as defined hereinbelow, and a screw speed of 130 rpm or 50 rpm:

| Type of zone | melting zone | introduction of reactants | grafting reaction | degassing zone | | head |
|---|---|---|---|---|---|---|
| Material temperature | 200° C. | 180° C. | 225° C. | 220° C. | 210° C. | 205° C. |

In Table 1 are listed: the type of extruder and its screw speed; the nature of the radical initiator and its amount expressed in weight-% with respect to the PA to be grafted; the nature and amount of vinylalkoxysilane introduced and grafted, expressed in weight-% with respect to the PA to be grafted; and the grafting efficiency.

[Table 1 follows at this point (as page 8)]

TABLE 1

| Expl | extruder screw speed | nature of the initiator | % initiator | nature of the silane | % silane introduced | % silane grafted | grafting efficiency (%) |
|---|---|---|---|---|---|---|---|
| 1 | (1) 130 rpm | DHBP | 0.05 | VTMO | 1 | 0.32 | 32 |
| 2 | (1) 130 rpm | DICUP | 0.05 | VTMO | 1 | 0.07 | 7 |
| 3 | (1) 130 rpm | DHBP | 0.05 | VTMO | 2 | crosslinked | crosslinked |
| 4 | (2) 50 rpm | DHBP | 0.05 | VTMO | 1 | 0.40 | 40 |
| 5 | (2) 50 rpm | DICUP | 0.05 | VTMO | 1 | 0.35 | 35 |
| 6 | (2) 50 rpm | DHBP | 0.05 | VTMO | 2 | 0.62 | 31 |
| 7 | (2) 50 rpm | DICUP | 0.05 | VTEO | 2.6 | 1.1 | 41 |
| 8 | (2) 50 rpm | DHBP | 0.29 | VTEO | 2.6 | 1.1 | 41 |
| 9 | (2) 50 rpm | Y1490 | 0.32 | VTEO | 2.6 | 1.08 | 40 |
| 10 | (2) 50 rpm | DICUP | 0.05 | VTMOEO | 3.8 | 1.81 | 47 |
| 11 | (2) 50 rpm | DHBP | 0.29 | VTMOEO | 3.8 | 1.68 | 44 |
| 12 | (2) 50 rpm | Y1490 | 0.32 | VTMOEO | 3.8 | 1.84 | 48 |
| 13 | (2) 130 rpm | DICUP | 0.05 | VTMO | 2 | 0.19 | 10 |

The subject of the invention is also the grafted and crosslinked polyamides and the process for crosslinking them. These crosslinked polyamides may be used for the manufacture of molded or extruded articles, such as tubes, jackets, single-layer and multilayer films and complex parts, and of powder for coating substrates. They are obtained by Example 14 to 16 grafting of nylon-11 of varying molecular weight

The polyamides grafted are a 11,400 $\overline{M}_n$ nylon-11 of solution viscosity of approximately 0.9 (Example 14), a 22,000 $\overline{M}_n$ nylon-11 of solution of approximately 1.5

(Example 15) and a 19,200 $\overline{M}_n$ nylon-11 of solution viscosity of approximately 1.35 (Example 16).

0.05 by weight, with respect to the nylon-11 to be grafted, of dicumyl peroxide is used as radical initiator and vinyltrimethoxysilane (VTMO) is grafted onto the nylon-11.

The extruder use is of the type (2) (cup profile; twin screw); its screw speed is 50 rpm.

In Table 2 are listed:

the amount of vinyltrimethoxysilane (VTMO) introduced and grafted, expressed in weight-% with respect to the PA to be grafted;
the grafting efficiency.
The results are collated in Table 2.

TABLE 2

| Expl. | % VTMO introduced | % VTMO grafted | grafting efficiency (%) |
|---|---|---|---|
| 14 | 0.91 | 0.29 | 26.5 |
| 15 | 0.93 | 0.28 | 26 |
| 16 | 0.78 | 0.16 | 20.5 |

Example 17 to 22
grafting of nylon-12

The PA grafted is a 11,500 $\overline{M}_n$ nylon-12 of solution viscosity of approximately 0.9. The extruder used is of the type (2) (cup profile; twin screw); its screw speed is 50 rpm.
In Table 3 are listed:

the nature of the radical initiator and its amount expressed in weight-% with respect to the PA to be grafted;
the nature and amount of silane of silane introduced and grated, expressed in weight-% with respect to the PA to be grafted;
the grafting efficiency.

TABLE 3

| Expl | nature of the initiator | % initiator | nature of the silane | % silane introduced | % silane grafted | grafting efficiency (%) |
|---|---|---|---|---|---|---|
| 17 | DICUP | 0.05 | VTEO | 2.5 | 0.79 | 32 |
| 18 | DHBP | 0.29 | VTEO | 2.15 | 0.75 | 35 |
| 19 | Y1490 | 0.32 | VTEO | 2.60 | 0.92 | 35 |
| 20 | DICUP | 0.05 | VTMOEO | 3.51 | 1.68 | 48 |

TABLE 3-continued

| Expl | nature of the initiator | % initiator | nature of the silane | % silane introduced | % silane grafted | grafting efficiency (%) |
|---|---|---|---|---|---|---|
| 21 | DHBP | 0.29 | VTMOEO | 3.8 | 1.77 | 47 |
| 22 | Y1490 | 0.32 | VTMOEO | 3.7 | 1.56 | 43 |

Determination of the ease of processing of the grafted polyamides

In order to determine the ease of subsequent processing of the grafted polyamides, their viscosity is determined by measuring their Melt Index (MI) (with a 1 kg load at 235° C.) after having vacuum-dried them at room temperature.

For undried grafted polyamides whose degree of grafting is greater than 0.6% by weight, for example of VTMO, it is not possible to measure the Melt Index since, under the measurement conditions, the grafted polyamides crosslink and become ungradeable.

By way of comparison, the Melt Index of four ungrafted nylon-11s of the same $\overline{M}_n$ have also been given. The results are collated in Table 4.

TABLE 4

| Expl | 5 | 13 | 13,000 $\overline{M}_n$ nylon-11 | 14 | 11,400 $\overline{M}_n$ nylon-11 | 15 | 22,000 $\overline{M}_n$ nylon-11 | 16 | 9,400 $\overline{M}_n$ nylon-11 |
|---|---|---|---|---|---|---|---|---|---|
| MI | 14.7 | 25 | 36.1 | 22.5 | 35.7 | 5.5 | 15.4 | 2.6 | 22.3 |

Crosslinking of the grafted polyamides

The improvement in the dimensional heat stability and the solvent resistance of the grafted polyamides is measured after crosslinking.

The preceding grafted polyamides are crosslinked by hydrolysis in steam at 100° C. for 12 hours. It is observed that maximum crosslinking is achieved after 12 hours, but this optimum time depends on the temperature conditions and on the presence of an appropriate catalyst.

The insoluble content (or gel content) is measured at 90° C. in m-cresol. This gel content is determined by the difference in weight after 6 hours in contact with the solvent.

The resistance to hot deformation under load of the crosslinked polyamides is determined on injection molded specimens according to the ISO R527 ½ Standard. The elongation of the specimen at the desired temperature and under a desired stress is monitored as a function of time and measured after 1 hour.

By way of comparison, the gel content and the resistance to hot deformation of 13,000 $\overline{M}_n$ nylon-11 and of 11,500 $\overline{M}_n$ nylon-12, which are neither grafted nor crosslinked, used for the grafting of the polyamides of Examples 6, 8, 12, 19, and 21 are measured.

The results are collated in Table 5.

TABLE 5

| Crosslinked PA from the grafted PA of Expl. | 6 | 8 | 12 | 13,000 $\overline{M}_n$ nylon-11 | 19 | 21 | 11,500 $\overline{M}_n$ nylon-12 |
|---|---|---|---|---|---|---|---|
| gel content (%) | 73.2 | 77.6 | 75.6 | 0 | 81.4 | 81.6 | 0 |
| creep 135° C./ (%) 1 h 2 MPa | not-measured | 1.2 | not-measured | 1.8 | 1.3 | 0.4 | 2 |

Comparative Examples 23 And 24 According to DE 3,545,032

According to DE 3,545,032, a 13,000 $\overline{M}_n$ nylon-11 (Example 23) and a 11,500 $\overline{M}_n$ nylon-12 (Example 24) are chain-end grafted with an alkoxysilane having an epoxy function, such as glycidyl-3-oxypropyltrimethoxysilane (GLYMO), in an extruder of type (2) (cup profile; twin screw) with a screw speed of 50 rpm and a temperature profile identical to that of Examples 1 to 13.

The crosslinkability and the hydrolytic stability of the polyamides thus grafted, the grafted nylon-11 and nylon-12 of Examples 12 and 19 and the ungrafted nylon-11 and nylon-12 of the same $\overline{M}_n$ are compared. The crosslinkability and the hydrolytic stability are determined by measuring the insoluble content or gel content in m-cresol according to the method described previously, after having left each specimen in a solution of 0.1N HCl containing 500 ppm of a catalyst for hydrolysing the alkoxysilane functions, such as dibutyltin dilaurate (DBTDL), for varying durations.

The results are collated in Table 6, in which degree of grafting is expressed in mols of grafted species per 100 grams of polymer before grafting.

TABLE 6

| Expl. | Nature of the PA | Nature of the grafted species | Degree of grafting | Gel content after a dwell time in 0.1 N HCl of | | | |
|---|---|---|---|---|---|---|---|
| | | | | 0 h | 3 h | 6 h | 22 h |
| | PA-11 | — | 0 | 0 | 0 | 0 | 0 |
| 12 | PA-11 | VTMOEO | 0.0066 | 0 | 0.8 | 0.3 | 38.5 |
| 23 | PA-11 | GLYMO | 0.01 | 0 | 0.8 | 0.1 | 0 |
| | PA-12 | — | 0 | 0 | 0 | 0 | 0 |
| 19 | PA-12 | VTEO | 0.0018 | 0 | 52.8 | 59.2 | 91.2 |
| 24 | PA-12 | GLYMO | 0.0087 | 0 | 44.1 | 68.5 | 99.6 |

What is claimed is:

1. A thermoplastic elastomer comprising a polyamide having at least one polymeric chain, wherein said polymeric chain has grafted thereto at least one moiety derived by reacting said polyamide with an unsaturated alkoxysilane in the presence of a polymerization initiator.

2. The thermoplastic elastomer of claim 1, having a plurality of polymeric chains which have grafted thereto from about 0.1 to about 5 weight-percent of said silane moieties.

3. The thermoplastic elastomer of claim 1, wherein said polyamide is an aliphatic, cycloaliphatic, or aromatic polyamide or a copolymer thereof and said unsaturated alkoxysilane is an (acryloxyalkyl)-trialkoxysilane, a (methacryloxyalkyl)trialkoxysilane, or a silane of the formula $CH_2=CH-Si(OR)_3$ wherein R is an alkyl or an alkoxyalkyl group.

4. The thermoplastic elastomer of claim 3, wherein said polyamide is selected from the group consisting of nylons and polyetheramides.

5. The thermoplastic elastomer of claim 4, wherein said unsaturated alkoxysilane is selected from the group consisting of vinyltrimethoxysilane, vinyltriethoxysilane, vinyltrimethoxyethoxysilane, and 3-methacryloxypropyltrimethoxysilane.

6. A thermoplastic elastomer comprising a polyamide having at least one polymeric chain, wherein said polymeric chain has grafted thereto at least one moiety derived by reacting said polyamide with an unsaturated alkoxysilane in the presence of a polymerization initiator, and wherein the grafted polyamide is hydrolytically crosslinked.

7. The thermoplastic elastomer of claim 6, having an insoluble content greater than 80% measured at 90° C. in m-cresol.

8. The thermoplastic elastomer of claim 1 comprising at least 50% by weight of polyamide.

9. The thermoplastic elastomer of claim 1 wherein the unsaturated alkoxysilane is bound at positions other than at chain ends of the polyamide.

* * * * *